US012739940B2

(12) United States Patent
Rajendran et al.

(10) Patent No.: US 12,739,940 B2
(45) Date of Patent: Sep. 15, 2026

(54) SMART GNB COORDINATION IN TELECOMMUNICATIONS NETWORKS

(71) Applicant: BOOST SUBSCRIBERCO L.L.C., Englewood, CO (US)

(72) Inventors: Karupaiah Rajendran, Sachse, TX (US); Manish Uniyal, Parker, CO (US); Pankaj Bhasin, Allen, TX (US)

(73) Assignee: BOOST SUBSCRIBERCO L.L.C., Englewood, CO (US)

( * ) Notice: Subject to any disclaimer, the term of this patent is extended or adjusted under 35 U.S.C. 154(b) by 256 days.

(21) Appl. No.: 18/785,799

(22) Filed: Jul. 26, 2024

(65) Prior Publication Data

US 2026/0032774 A1 Jan. 29, 2026

(51) Int. Cl.

| | |
|---|---|
| ***H04W 76/30*** | (2018.01) |
| ***H04W 36/08*** | (2009.01) |
| ***H04W 36/18*** | (2009.01) |
| ***H04W 76/11*** | (2018.01) |
| *H04W 88/14* | (2009.01) |

(52) U.S. Cl.

CPC .......... *H04W 76/30* (2018.02); *H04W 36/08* (2013.01); *H04W 36/185* (2023.05); *H04W 76/11* (2018.02); *H04W 88/14* (2013.01)

(58) Field of Classification Search

CPC ......... H04W 36/0055; H04W 36/0061; H04W 36/0064; H04W 36/0077; H04W 36/08; H04W 36/185; H04W 76/11; H04W 76/30; H04W 88/14

See application file for complete search history.

(56) References Cited

U.S. PATENT DOCUMENTS

| | | | | |
|---|---|---|---|---|
| 2020/0314700 | A1* | 10/2020 | Da Silva | H04W 36/04 |
| 2023/0239662 | A1* | 7/2023 | Baek | H04W 76/40<br>370/329 |
| 2024/0422233 | A1* | 12/2024 | Belling | H04L 67/51 |
| 2025/0106812 | A1* | 3/2025 | Nord | H04W 60/04 |
| 2025/0227606 | A1* | 7/2025 | Wang | H04W 48/18 |

* cited by examiner

*Primary Examiner* — Pao Sinkantarakorn

(74) *Attorney, Agent, or Firm* — Quarles & Brady, LLP

(57) ABSTRACT

Systems and methods of managing communication sessions perform or comprise receiving, at a first network node associated with an AMF, a path switch request, the path switch request indicating a handover request for a UE from a first to a second gNB, wherein the UE is associated with a RAN identifier corresponding to a communication session between the UE and the first gNB and an AMF identifier corresponding to a communication session between the UE and the AMF; determining whether the AMF identifier is associated with another RAN identifier; and in response to a determination that the AMF identifier is not associated with another RAN identifier, causing the second gNB to issue a UE context release request to the first network node to cause the first network node to terminate all communication sessions associated with the AMF identifier.

20 Claims, 8 Drawing Sheets

SMART GNB COORDINATION IN TELECOMMUNICATIONS NETWORKS

BACKGROUND

This disclosure relates to wireless data networks, such as 5G wireless networks. Wireless networks that transport digital data and telephone calls are becoming increasingly sophisticated. Currently, fifth generation (5G) broadband cellular networks are being deployed around the world. These 5G networks use emerging technologies to support data and voice communications with millions, if not billions, of mobile phones, computers, and other devices. 5G technologies are capable of supplying much greater bandwidths than previously available technologies.

The discussion above is merely provided for general background information and is not intended to be used as an aid in determining the scope of the claimed subject matter.

SUMMARY

Various aspects of the present disclosure relate to systems and methods in a telecommunications network to coordinate handover and radio resource control (RRC) establishment/reestablishment, for example to achieve improved call reliability.

According to one aspect of the present disclosure, a method of managing communication sessions in a telecommunications network is provided. The method comprises receiving, at a first network node associated with an Access and Mobility Management Function (AMF), a path switch request, the path switch request indicating a handover request for a user equipment (UE) from a first gNB to a second gNB, wherein the UE is associated with a radio access network (RAN) identifier corresponding to a communication session between the UE and the first gNB and an AMF identifier corresponding to a communication session between the UE and the AMF; determining whether the AMF identifier is associated with another RAN identifier; and in response to a determination that the AMF identifier is not associated with another RAN identifier, causing the second gNB to issue a UE context release request to the first network node, the UE context release request configured to cause the first network node to terminate all communication sessions associated with the AMF identifier.

According to another aspect of the present disclosure, a telecommunications network is provided. The network comprises at least one processor in communication with a first network node; and a memory storing instructions that, when executed by the at least one processor, cause the first network node to receive a context release approval request from a second network node associated with an Access and Mobility Management Function (AMF), wherein the context release approval request is in response to a path switch request received by the second network node, the path switch request indicating a handover request for a user equipment (UE) from a first gNB to a second gNB, wherein the UE is associated with a radio access network (RAN) identifier corresponding to a communication session between the UE and the first gNB and an AMF identifier corresponding to a communication session between the UE and the AMF, determine whether the AMF identifier is associated with another RAN identifier, and in response to a determination that the AMF identifier is not associated with another RAN identifier, cause the second gNB to issue a UE context release request to the second network node, the UE context release request configured to cause the second network node to terminate all communication sessions associated with the AMF identifier.

According to another aspect of the present disclosure, a non-transitory computer-readable medium is provided. The non-transitory computer-readable medium stores instructions that, when executed by at least one processor of a computer in a telecommunications network, cause the computer to perform operations comprising receiving, at a first network node associated with an Access and Mobility Management Function (AMF), a path switch request, the path switch request indicating a handover request for a user equipment (UE) from a first gNB to a second gNB, wherein the UE is associated with a radio access network (RAN) identifier corresponding to a communication session between the UE and the first gNB and an AMF identifier corresponding to a communication session between the UE and the AMF; determining whether the AMF identifier is associated with another RAN identifier; and in response to a determination that the AMF identifier is not associated with another RAN identifier, causing the second gNB to issue a UE context release request to the first network node, the UE context release request configured to cause the first network node to terminate all communication sessions associated with the AMF identifier.

BRIEF DESCRIPTION OF THE DRAWINGS

The following drawings are provided to help illustrate various features of examples of the disclosure and are not intended to limit the scope of the disclosure or exclude alternative implementations.

DETAILED DESCRIPTION

Figure 1:
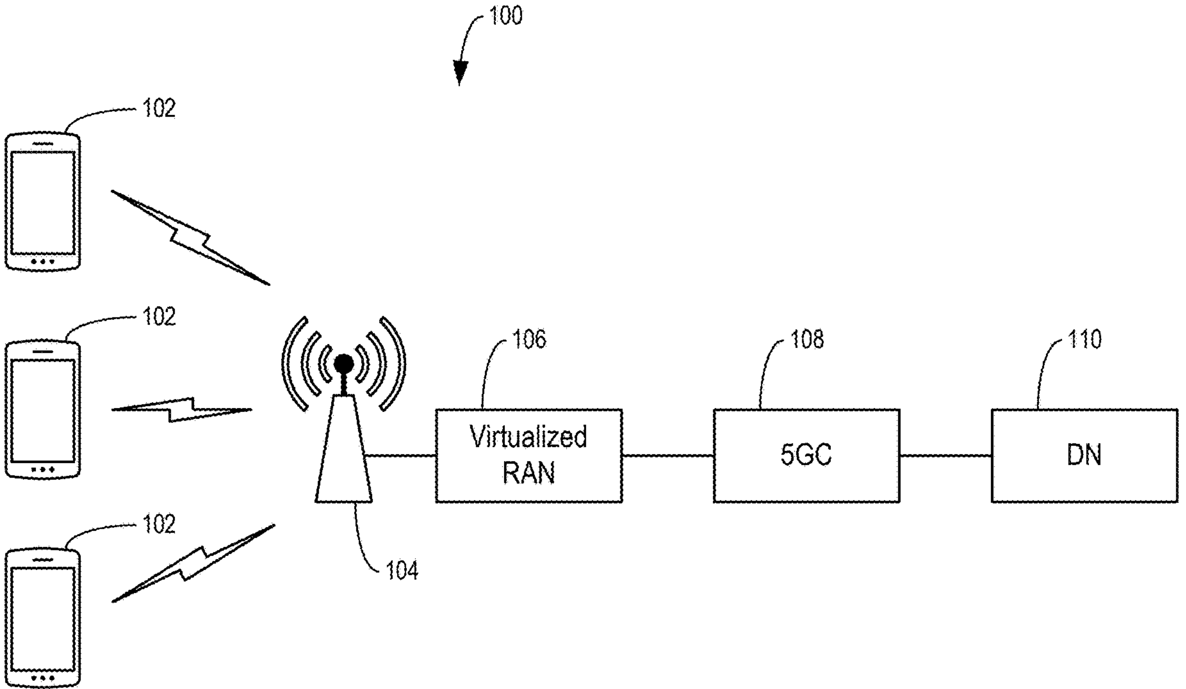
FIG. 1 illustrates an example of a telecommunications network in accordance with various aspects of the present disclosure.

The disclosed technology is not limited in its application to the details of construction and the arrangement of components set forth in the following description or illustrated in the following drawings. Other examples of the disclosed technology are possible and examples described and/or illustrated here are capable of being practiced or of being carried out in various ways. The terminology in this document is used for the purpose of description and should not be regarded as limiting. Words such as "including," "comprising," and "having" and variations thereof as used herein are meant to encompass the items listed thereafter, equivalents thereof, as well as additional items.

A plurality of hardware and software-based devices, as well as a plurality of different structural components can be used to implement the disclosed technology. In addition, examples of the disclosed technology can include hardware, software, and electronic components or modules that, for purposes of discussion, can be illustrated and described as if the majority of the components were implemented solely in hardware. However, in at least one example, the electronic based aspects of the disclosed technology can be implemented in software (for example, stored on non-transitory computer-readable medium) executable by one or more electronic processors. Although certain drawings illustrate hardware and software located within particular devices, these depictions are for illustrative purposes only. In some examples, the illustrated components can be combined or divided into separate software, firmware, hardware, or combinations thereof. As one example, instead of being located within and performed by a single electronic processor, logic and processing can be distributed among multiple electronic processors. Regardless of how they are combined or divided, hardware and software components can be located on the same computing device or can be distributed among different computing devices connected by one or more networks or other suitable communication links.

The present disclosure is directed to wireless communications networks, also referred to herein as telecommunications networks. The systems and methods set forth herein may be implemented on a telecommunications network in compliance with any telecommunication standard or group of standards; for example, fourth-generation (4G) network standards such as Long Term Evolution (LTE) and/or fifth-generation (5G) network standards such as New Radio (NR); In an example implementation, the wireless communications networks described herein may represent a portion of a wireless network built around 5G standards promulgated by standards setting organizations under the umbrella of the Third Generation Partnership Project ("3GPP"). Accordingly, in some configurations, the wireless communication network may be a 5G network, such as, e.g., a 5G cellular network. Such 5G networks, including the wireless communication networks described herein, may comply with industry standards, such as, e.g., the Open Radio Access Network (Open RAN or O-RAN) standard that describes interactions between the network and user equipment (e.g., mobile phones and the like).

The O-RAN model follows a virtualized model for a 5G wireless architecture in which 5G base stations, referred to as next-generation Node Bs (gNBs), are implemented using separate centralized units (CUs), distributed units (DUs), and radio units (RUs). In some configurations, O-RAN CUs and DUs may be implemented using software modules executed by distributed (e.g., cloud) computing hardware. Virtualization allows for various other components of the cellular network, such as cellular network core functions, to be implemented as code that is executed using general-purpose computing resources. Such general-purpose computing resources can be part of a public cloud-computing platform that provides virtual private clouds (VPCs) for multiple clients. On a hybrid cloud cellular network, RAN components of the cellular network are in communication with components of the cellular network executed on a public cloud computing platform, such as Amazon Web Services (AWS).

5G networks are generally configured to provide coverage in a large geographical range via multiple gNBs that provide overlapping coverage. To enable user mobility, the network can "handover" a user device ("user equipment" or UE) from one gNB to another. For example, if the user is traveling along a highway, the network can continually handover the UE along a series of gNBs that provide coverage to different areas along the highway, thus ensuring uninterrupted service.

FIG. 1 illustrates an example of a telecommunications network 100 in accordance with various aspects of the present disclosure. In the telecommunications network 100 of FIG. 1, a plurality of UEs 102 are connected to a wireless access point 104, which in turn is connected to a set of virtualized RAN components 106. The virtualized RAN components 106 provide a connection to a 5G core network (5GC) 108, which in turn provides a connection to a data network 110. The wireless access point 104 and the virtualized RAN components 106 may collectively be referred to as a next-generation RAN (NG-RAN).

In some configurations, the telecommunications network 100 may be a standalone (SA) network (e.g., a 5G SA network) that utilizes 5G cells for both signaling and information transfer via a 5G packet core architecture. However, the present disclosure may be implemented with any type of telecommunication network capable of being virtualized.

As used herein, the term "UE" may be one of various types of end-user devices, such as cellular phones, smartphones, cellular modems, cellular-enabled computerized devices, sensor devices, robotic equipment, vehicles, IoT devices, gaming devices, access points (Aps), or any computerized device capable of communicating via a cellular network. More generally, a UE 102 can represent any type of device that has an incorporated 5G interface, such as a 5G modem. Examples can include sensor devices, Internet of Things (IOT) devices, manufacturing robots, unmanned aerial (or land-based) vehicles, network-connected vehicles, etc. Depending on the location of individual UEs, a UE 102 may use RF to communicate with various base stations of a telecommunications network. While FIG. 1 illustrates three UEs 102 connected to the wireless access point 104, in practical implementations any number of UEs 102 may be connected to the wireless access point 104 at any given time.

The wireless access point 104 represents the physical infrastructure (e.g., a 5G tower) to which the UEs 102 connect. The wireless access point 104 may be any structure to which one or more antennas are mounted. The wireless access point 104 may be a dedicated cellular tower, a building, a water tower, or any other man-made or natural structure to which one or more antennas can reasonably be mounted to provide cellular coverage to a geographic area. The wireless access point 104 may include an RU configured to convert radio signals sent to and received from the antenna(s) into a digital signal. The wireless access point 104 is connected to the virtualized RAN components 106 via a fronthaul link over which the digital signals may be communicated. The virtualized RAN components 106 may include a DU connected to a CU via a midhaul link. The CU may be connected to the 5GC 108 via a backhaul link. While FIG. 1 illustrates a single wireless access point 104 and a single set of virtualized RAN components 106, in practical implementations the telecommunications network 100 may include any number of wireless access points 104 and/or any number of virtualized RAN components 106.

In one example, the telecommunications network 100 may be configured according to a region-based network topology. For example, the telecommunications network 100 may be implemented using a cloud computing platform that is logically and physically divided up into various different cloud computing regions (e.g., AWS regions). The cloud computing regions may be based on the geographical location of the gNBs; for example, the telecommunications network 100 for a given nation may be divided into a number of geographical regions. Each of the cloud computing regions can be isolated from other cloud computing regions to help provide fault tolerance, fail-over, load-balancing, and/or stability and each of the cloud computing regions can be composed of multiple availability zones or markets, each of which can be a separate data center located in general proximity to each other (e.g., within 100 miles). For example, one cloud computing region may have its datacenters and hardware located in the northeast of the United States while another cloud computing region may have its data centers and hardware located in California.

Each of the availability zones may be a discrete data center of a group of data centers that allows for redundancy, thereby to provide fail-over protection from other availability zones within the same cloud computing region. For example, if a particular data center of an availability zone experiences an outage, another data center of the availability zone or separate availability zone within the same cloud computing region can continue functioning and providing service. An availability zone may be divided into multiple local zones or areas-of-interest (AOIs). For instance, a client, such as a provider of the telecommunications network 100, can select from more options of the computing resources that can be reserved at an availability zone compared to a local zone. However, a local zone may provide computing resources nearby geographic locations where an availability zone is not available. Each local zone may be divided into multiple gNBs, each of which can serve one or more sites. A site may have one DU and a number of RUs (e.g., six RUs) assigned to it.

The 5GC 108 provides a plurality of 5G core functions. In the topology of a 5G NR cellular network, 5G core functions of 5GC 108 can logically reside as part of a national data center (NDC). An NDC can be understood as having its functionality existing in a cloud computing region across multiple availability zones. This arrangement allows for load-balancing, redundancy, and fail-over. In local zones, multiple regional data centers can be logically present. Each of regional data centers may execute 5G core functions for a different geographic region or group of RAN components. An example of 5G core components that can be executed within an RDC are described in more detail with regard to FIG. 2. The data network 110 may be the Internet, an enterprise data network, combinations thereof, and the like.

Figure 2:
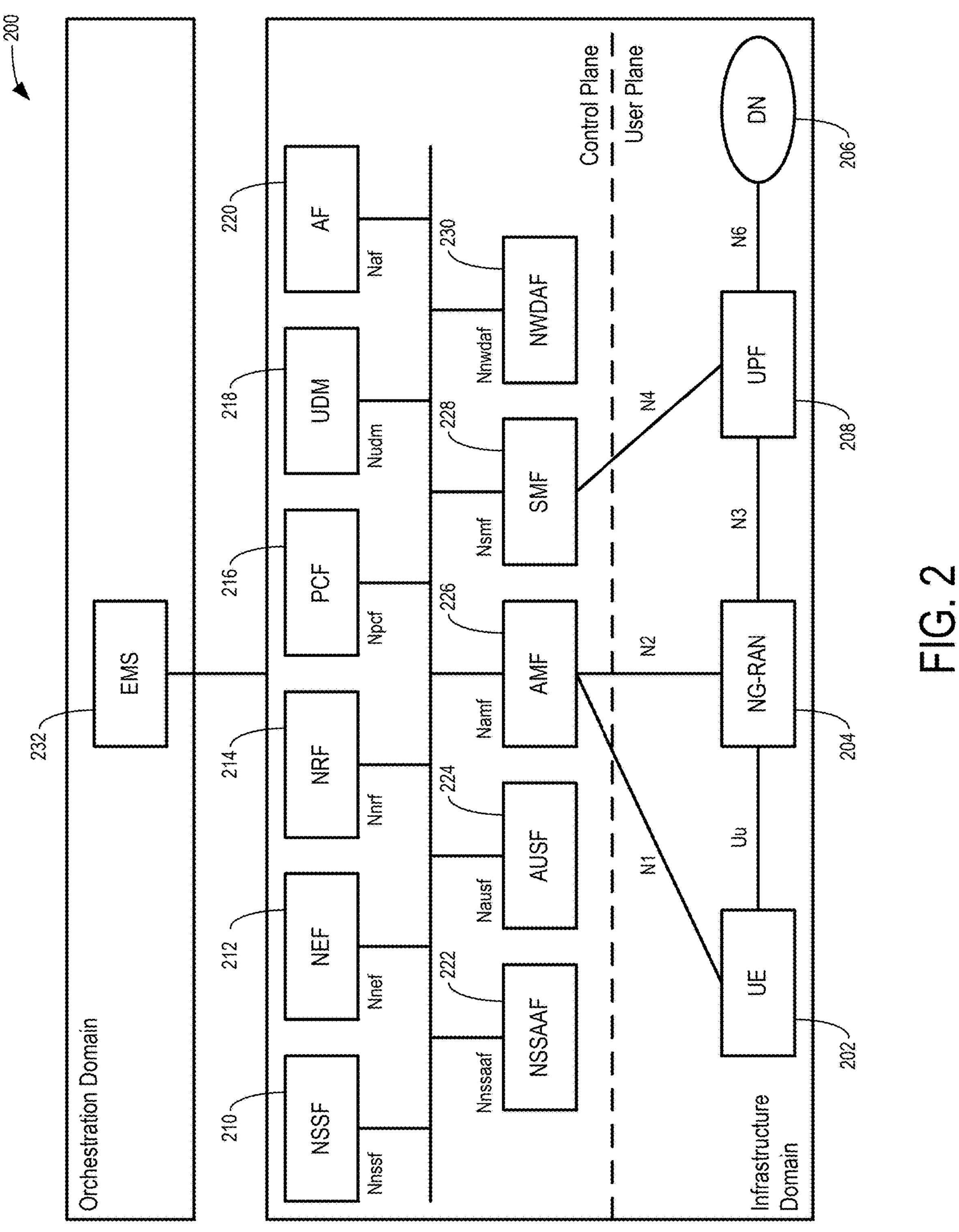
FIG. 2 illustrates an example of a service-based architecture for a telecommunications network in accordance with various aspects of the present disclosure.

FIG. 2 illustrates an example service-based architecture (SBA) 200 for a telecommunications network (e.g., the telecommunications network 100 of FIG. 1) in accordance with various aspects of the present disclosure. The SBA 200 includes an infrastructure domain, which is divided between a control plane (CP) and a user plane (UP), and an orchestration domain. The CP comprises a plurality of CP network functions (NFs). The UP comprises a UE 202 (e.g., one of the UEs 102 of FIG. 1) connected to an NG-RAN 204, and UP NFs. Using the SBA 200, the UE 202 accesses a data network 206 (e.g., the data network 110 of FIG. 1). For case of illustration, FIG. 1 only shows a single UE 202 being connected to the NG-RAN 204; however, in practical implementations any number of UEs 202 may be present, limited only by the capacity of the network.

The UP NFs include a User Plane Function (UPF) 208. The UPF 208 is a network function that routes and forwards user plane data packets between the base station (cell site; for example, the NG-RAN 204) and the external data network 206 (e.g., the Internet). The UPF 208 is similar to the service and packet gateway functions in a 4G network, but it is cloud-native and can be deployed anywhere to meet service requirements. It can also manage, prioritize, and duplicate data packets as they traverse the network, thus offering redundancy and quality-of-service (QOS) assurance.

The CP NFs include a Network Slice Selection Function (NSSF) 210, a Network Exposure Function (NEF) 212, a Network Repository Function (NRF) 214, a Policy Control Function (PCF) 216, a Unified Data Management (UDM) 218, an Application Function (AF) 220, a Network Slice-specific and SNPN Authentication and Authorization Function (NSSAAF) 222, an Authentication Server Function (AUSF) 224, an Access and Mobility Management Function (AMF) 226, a Session Management Function (SMF) 228, and a Network Data Analytics Function (NWDAF) 230. The orchestration domain includes an Element Management System (EMS) 232.

The NSSF 210 is a CP function that provides network slices to the AMF 226. A network slice is an independent, end-to-end logical network that runs on shared physical network infrastructure. It involves the allocation of network resources across all network infrastructure to meet specific service requirements, from the network core to the radio access network (RAN). Specific requirements may include QoS assurance, security policies, data isolation, dynamic policy management, etc.

The NEF 212 is a CP function that provides information regarding the network functions that are available to use (by the enterprise customer). It is similar to the 4G Service Capabilities Exposure Function (SCEF), but it is cloud-native and exposes event information, network monitoring, network control, provisioning capabilities, and policy/charging capabilities externally. This allows the enterprise customer to monitor and affect QoS and charging for devices.

The NRF 214 is a CP function that allows 5G network functions to be registered, discovered, and subsequently made available to customers. This is a unique capability in the standalone 5G network that allows customers to subscribe to the necessary microservices or to have dedicated network functions for their services.

The PCF 216 is a CP function that provides policies for mobility and session management. It is similar to the Policy and Charging Rules Function (PCRF) in a 4G network, but it is cloud-native and offers additional capabilities in the 5G network, including event-based policy triggers, resource reservation requests, and access network discovery and selection. The PCF directly influences QoS and subscriber spending limits, and as a result plays a role in the enhanced policy management and control capabilities of the 5G network.

The UDM 218 is a CP function that manages and stores subscriber and device information, default QoS and prioritization, authorized data channels, maximum bit rates, service continuity provisions, and the like. The UDM 218 is similar to the Home Subscriber Server (HSS) function in a 5G network, but it is cloud-native and designed for 5G services.

The AF 220 is a CP function that interacts with the 3GPP Core Network in order to provide services, for example to support one or more of application function influence on traffic routing, application function influence on service function chaining, accessing the NEF 212, interacting with the PCF 216, time synchronization service, IP multimedia subsystem (IMS) interactions with the 5GC, or packet data unit (PDU) set handling.

The NSAAF 222 is a CP function that supports authentication and authorization of slicing with an AAA server (Authentication, Authorization, and Accounting). It is a unique capability of the standalone 5G network that allows customers to access a predefined network slice or a newly requested network slice in real-time and using their own existing authentication infrastructure.

The AUSF 224 is a CP function that supports authentication for 3GPP access and untrusted non-3GPP access, and authentication of a UE for a disaster roaming service. It can act as an authentication server.

The AMF 226 is a CP function that manages registration, authorization, connection, reachability, and mobility. It is similar to the Mobility Management Entity (MME) function in a 4G network, but it is cloud-native and supports many additional capabilities unique to 5G. For example, it also supports dynamic updating of network interfaces and cellular sites, greater privacy via the use of a 5G temporary device identity, enhanced security across the user and control planes, and stores network slice information. It can also select an appropriate PCF for a device or use case.

The SMF 228 is a CP function that oversees packet data session management, IP address allocation, data tunneling from a cell site base station to the user plane function, and downlink notification management. It performs the tasks of the serving and packet gateways (S-GW & P-GW) in a 4G network, but also allows for control plane and user plane separation in 5G.

The NWDAF 230 is a CP function that collects data from pertinent network infrastructure relevant to a customer's services, including user equipment (device), network functions, network operations and administration, cloud, and edge that can be used for data analytics and insights. It is a unique standalone 5G network function that exposes full visibility to network performance and operations as they relate to a customer's key performance indicators (KPIs).

The SBA 200 further includes a plurality of service-based interfaces to provide access to or communication with the various NFs. As illustrated, these include an Nnssf interface for the NSSF 210, an Nnef interface for the NEF 212, an Nnrf interface for the NRF 214, an Npcf for the PCF 216, an Nudm interface for the UDM 218, an Naf interface for the AF 220, an Nnssaaf interface for the NSSAAF 222, an Nausf interface for the AUSF 224, an Namf interface for the AMF 226, an Nsmf interface for the SMF 228, and an Nnwdaf interface for the NWDAF 230. FIG. 1 also illustrates several reference points (i.e., interfaces between two NFs or entities), including an N1 interface between the UE 202 and the AMF 226, a Uu interface between the UE 202 and the NG-RAN 204, an N2 interface between the NG-RAN 204 and the AMF 226, an N3 interface between the NG-RAN 204 and the UPF 208, an N4 interface between the UPF 208 and the SMF 228, and an N6 interface between the UPF 208 and the data network 206.

The above-listed NFs and interfaces are intended to be illustrative and not exhaustive. In practical implementations, the SBA 200 may include additional NFs or other network entities, such as an Unstructured Data Storage Function (UDSF), a Network Slice Admission Control Function (NSCAF), a Unified Data Repository (UDR), a UE radio Capability Management Function (UCMF), a 5G-Equipment Identity Register (5G-EIR), a Charging Function (CHF), a Time Sensitive Networking AF (TSN AF), a Time Sensitive Communication and Time Synchronization Function (TSCTSF), a Data Collection Coordination Function (DCCF), an Analytics Data Repository Function (ADRF), a Messaging Framework Adaptor Function (MFAF), a Non-Seamless WLAN Offload Function (NSWOF), an Edge Application Server Discovery Function (EASDF), a Service Communication Proxy (SCP), a Security Edge Protection Proxy (SEPP), a Non-3GPP InterWorking Function (N3IWF), a Trusted Non-3GPP Gateway Function (TNGF), a Wireline Access Gateway Function (W-AGF), or a Trusted WLAN Interworking Function (TWIF).

The components of the orchestration domain provide life cycle management and monitoring of the various NFs. For example, the EMS 232 configures the virtual NFs with provisioning data. Because of the disaggregated nature of an SA 5G network, the EMS 232 services to nodes across a large geographical spread. It is to be noted that, while the following discussion refers to smart coordination operations performed by the EMS 232, in other implementations these operations may be implemented into one or a combination of the NFs described above and/or into another NF not expressly listed.

Any of the NFs illustrated in FIG. 2 and/or described above, as well as the EMS 232, may be implemented as a software unit residing on a server (i.e., in the cloud). Each NF can include multiple pods. A "pod" refers to a software sub-component of the NF. Kubernetes, Docker, or some other container orchestration platform can be used to create and destroy the logical CU or 5G core units and subunits as needed for the data network 110 to function properly. The pods may be deployed on one or more virtual machines configured by a network operator. Kubernetes allows for container deployment, scaling, and management. As an example, if cellular traffic increases substantially in a region, an additional logical CU or components of a CU may be deployed in a data center near where the traffic is occurring without any new hardware being deployed. Instead, processing and storage capabilities of the data center would be devoted to the needed functions. When the need for the logical CU or subcomponents of the CU no longer exists, Kubernetes can allow for removal of the logical CU. Kubernetes can also be used to control the flow of data (e.g., messages) and inject a flow of data to various components. This arrangement can allow for the modification of nominal behavior of various layers. Thus, the SBA 200 may be implemented on or using one or more computing devices, each of which includes a processor and a memory.

As used herein, a "processor" may include one or more individual electronic processors, each of which may include one or more processing cores, and/or one or more programmable hardware elements. The processor may be or include any type of electronic processing device, including but not limited to central processing units (CPUs), graphics processing units (GPUs), application-specific integrated circuits (ASICs), field-programmable gate arrays (FPGAs), microcontrollers, digital signal processors (DSPs), or other devices capable of executing software instructions. When a device is referred to as "including a processor," one or all of the individual electronic processors may be external to the device (e.g., to implement cloud or distributed computing). In implementations where a device has multiple processors and/or multiple processing cores, individual operations described herein may be performed by any one or more of the microprocessors or processing cores, in series or parallel, in any combination. In some implementations, one or more of the processing units or processing cores may be remote (e.g., cloud-based).

As used herein, a "memory" may be any storage medium, including a non-volatile medium, e.g., a magnetic media or hard disk, optical storage, or flash memory; a volatile medium, such as system memory, e.g., random access memory (RAM) such as dynamic RAM (DRAM), synchronous dynamic RAM (SDRAM), static RAM (SRAM), extended data out (EDO) DRAM, extreme data rate dynamic (XDR) RAM, double data rate (DDR) SDRAM, etc.; on-chip memory; and/or an installation medium where appropriate, such as software media, e.g., a CD-ROM, or floppy disks, on which programs may be stored and/or data communications may be buffered. The term "memory" may also include other types of memory or combinations thereof. For the avoidance of doubt, cloud storage is contemplated in the definition of memory. A memory is an example of a non-transitory computer-readable medium which stores instructions that are executable by a processor (or processors), the execution of which causes the executing device (e.g., a computer) to perform certain operations, such as those operations described herein.

In the SBA 200 shown in FIG. 2, the NG-RAN 204 may include some or all of the virtualized RAN components 106 illustrated in FIG. 1. Thus, the NG-RAN 204 may include at least one CU, at least one DU configured to operate under the control of one or more of the at least one CU, and at least one RU configured to operate under the control of one or more of the at least one DU. For example, each CU in the NG-RAN 204 may control a plurality of DUs, each of which in turn may control a plurality of RUs. Each RU may be operatively connected to a power amplifier and transmission elements (e.g., antennae) configured to cooperate to transmit signals to connected UEs 202 according to a transmission schedule.

When a UE seeks to join the network, the network (e.g., the AMF 226) may generate a RAN identifier (RAN-id) that identifies a communication session between the UE and a given gNB, and an AMF identifier (AMF-id) that uniquely identifies the UE and thus corresponds to all communication sessions between the UE and all gNBs associated with the AMF 226. When handover occurs (e.g., from a source gNB to a target gNB), the AMF 226 is to reroute communications to the UE via a different gNB in order to maintain telecommunications services to the UE. Thus, the target gNB may send a path switch request so that the AMF generates a new RAN-id while keeping the same AMF-id. Once the communication session between the UE and the target gNB has been established, the target gNB sends a context release message to the source gNB, which causes the source gNB to flush the context associated with the UE.

If, however, there is a connection failure between the UE and the target gNB, the UE will try to reestablish a connection with the source gNB. The source gNB then communicates with the target gNB to reestablish the connection. However, this may lead to connection problems. For example, if the target gNB flushes out the RAN-id info and also clears the AMF-id, the context release message may cause an existing call to drop abnormally.

Figure 3:
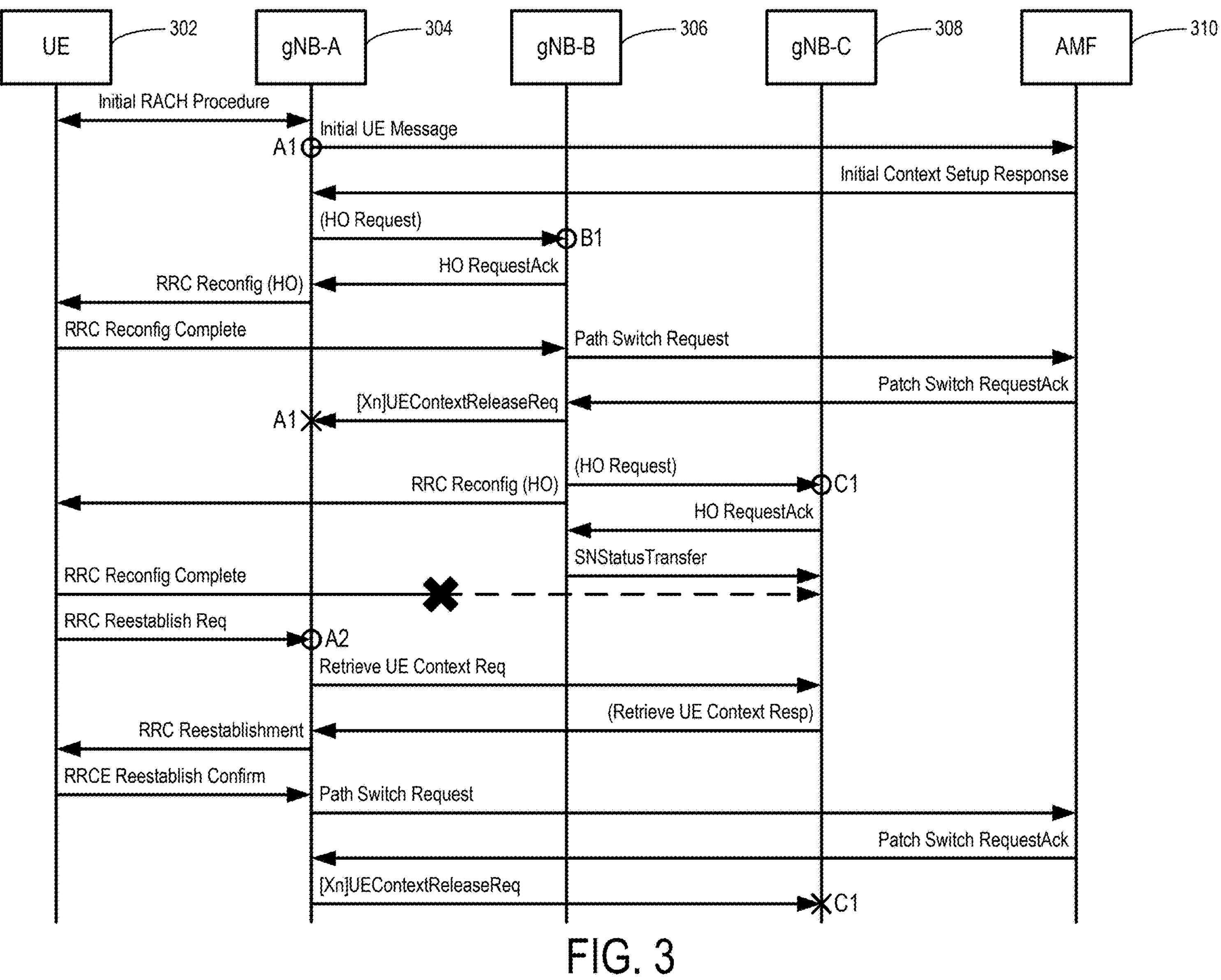
FIG. 3 illustrates an example of a communication flow, in accordance with a comparative example.
Figure 3:
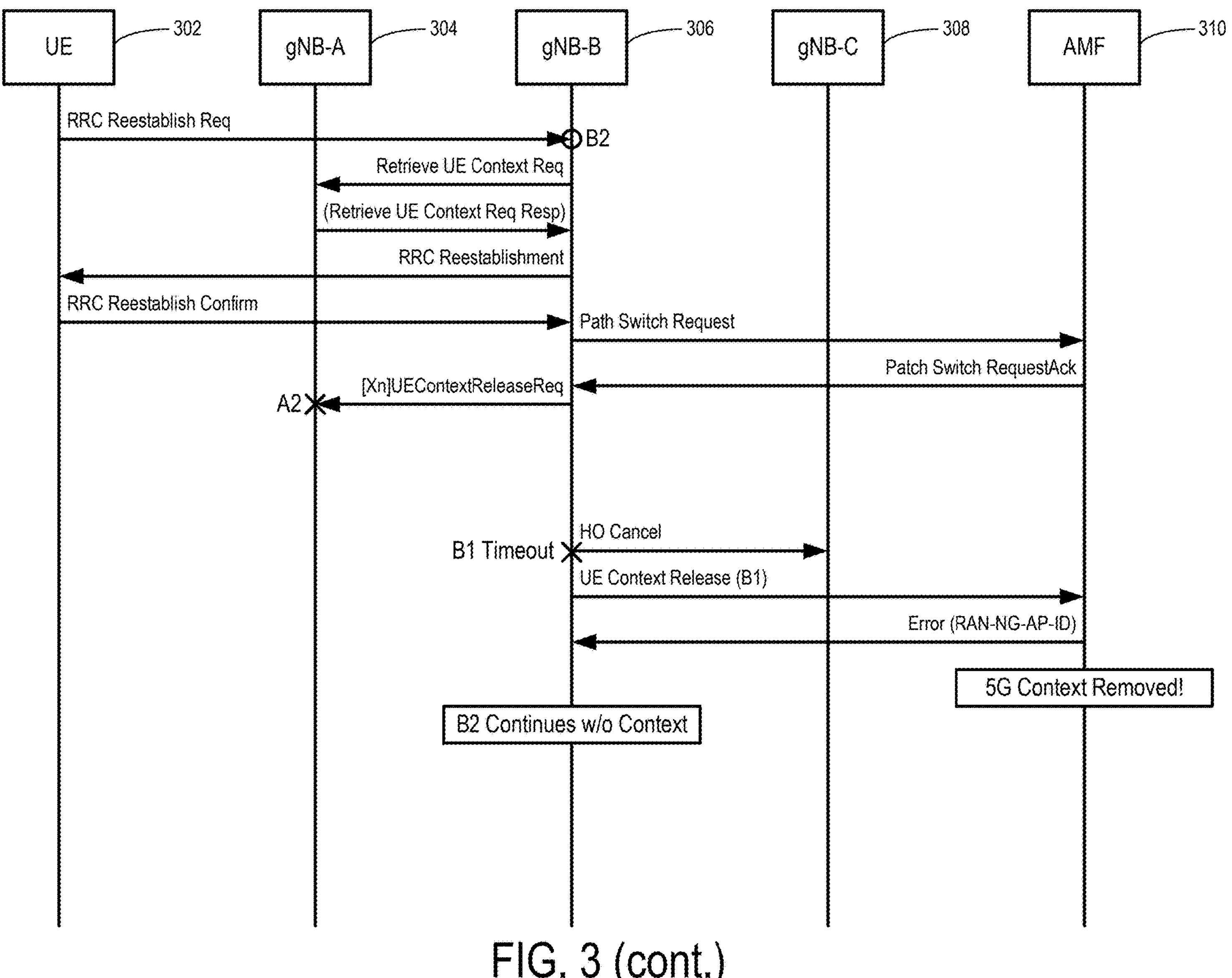

This error may be caused in a number of scenarios, including an incomplete inter-gNB handover followed by an inter-gNB radio resource reestablishment to the source gNB; an incomplete inter-gNB radio resource reestablishment followed by an inter-gNB radio resource reestablishment to the source gNB; an incomplete inter-GNB handover, followed by an intra-gNB radio resource reestablishment to the target gNB, followed by an inter-gNB handover back to the source gNB; or an incomplete inter-gNB radio resource reestablishment, followed by an intra-gNB radio resource reestablishment to the target gNB, followed by an inter-gNB handover back to the source gNB. In any of these situations, the CU associated with the source gNB has two different call contexts (e.g., two different RAN-ids). The original context eventually times out and the gNB initiates a release procedure between the core network and the RAN (e.g., via the AMF). This causes the network to release the entire AMF session for the user, and the new call continues without context, resulting in no data flow between the UE and the network. FIG. 3 illustrates an example this issue within a comparative network.

FIG. 3 illustrates a message flow among a UE 302, three gNBs 304, 306, and 308, and an AMF 310. When the UE 302 initially joins the network via gNB-A 304, the gNB-A 304 sends an initial message to the AMF 310. In response, the AMF 310 establishes a first RAN-id and an AMF-id for the UE 302. At this point, a communication session A1 is established between the UE 302 and the gNB-A 304. At a later time, the UE 302 seeks handover from the gNB-A 304 to the gNB-B 306. The gNB-A 304 sends a handover request message to the gNB-B 306, in response to which the gNB-B 306 establishes a communication session B1 between the UE 302 and the gNB-B 306 and requests that the UE 304 reconfigure its RRC accordingly. The communication session B1 is established with a second RAN-id but the same AMF-id. Upon reconfiguration completion, the gNB-B 306 requests a path switch from the AMF 310, which is acknowledged by the AMF 310. In response, the gNB-B 306 issues a UE context release request to the gNB-A 304, the gNB-A 304 terminates the communication session A1 and flushes the first RAN-id, and the AMF 310 updates itself to reflect the second RAN-id. This is an example of a successful handover.

At some later point, the UE 302 may seek handover from the gNB-B 306 to the gNB-C 308. The gNB-B sends a handover request message to the gNB-C 308, in response to which the gNB-C 308 establishes a communication session C1 between the UE 302 and the gNB-C 308 and requests that the UE 304 reconfigure its RRC again. The communication session C1 is established with a third RAN-id (that is different from the first and second RAN-ids) but the same AMF-id. However, in the illustrated example, before the handover can be successfully completed there is a communication error. For example, the UE 302 may transmit a message indicating that its RRC configuration has completed, but the message may not be received by the gNB-C 310 (e.g., due to poor RF conditions).

Thus, the UE 302 attempts to reestablish communications with the gNB-A 304. The gNB-A 304 establishes a communication session A2 between the UE 302 and the gNB-A 304, with a fourth RAN-id (that is different from the first through third RAN-ids) and the same AMF-id. The gNB-A 304 then transmits a path switch request to the AMF 310 and, upon receipt of acknowledgement, transmits a UE context release request to the gNB-C 308. This causes the gNB-C 308 to terminate the communication session C1 and flush the third RAN-id. The AMF 310 updates itself to reflect the fourth RAN-id, without knowledge of the third RAN-id. However, the gNB-B 306 continues to await further messages and thus the communication session B1 remains active.

If the UE 302 then seeks handover to the gNB-B 306, the gNB-B 306 establishes a new communication session B2 with a fifth unique RAN-id (and the same AMF-id), even though the communication session B1 remains active. At this point, the AMF 310 updates itself to reflect the fifth RAN-id. As such, there are two communication sessions between the UE 302 and the gNB-B 306 which have the same AMF-id but different RAN-ids. With regard to the communication session B1, after the passage of some time without receiving a UE context release request from the gNB-C 308, the gNB-B 306 times out and transmits a message to the gNB-C 308 to cancel the previous handover request. When the gNB-B 306 requests that the AMF 310 release the UE context using the third RAN-id, the AMF 310 issues an error indication because there is a context mismatch between the AMF-id and the RAN-id (i.e., the AMF 310 associates the AMF-id with the fifth RAN-id, not the third RAN-id). At this point, the 5G context for the UE 302 is removed, but the communication session B2 continues without context. This may lead to the call corresponding to the communication session B2 experiencing errors, including dropped calls, muting, and the like.

Figure 4:
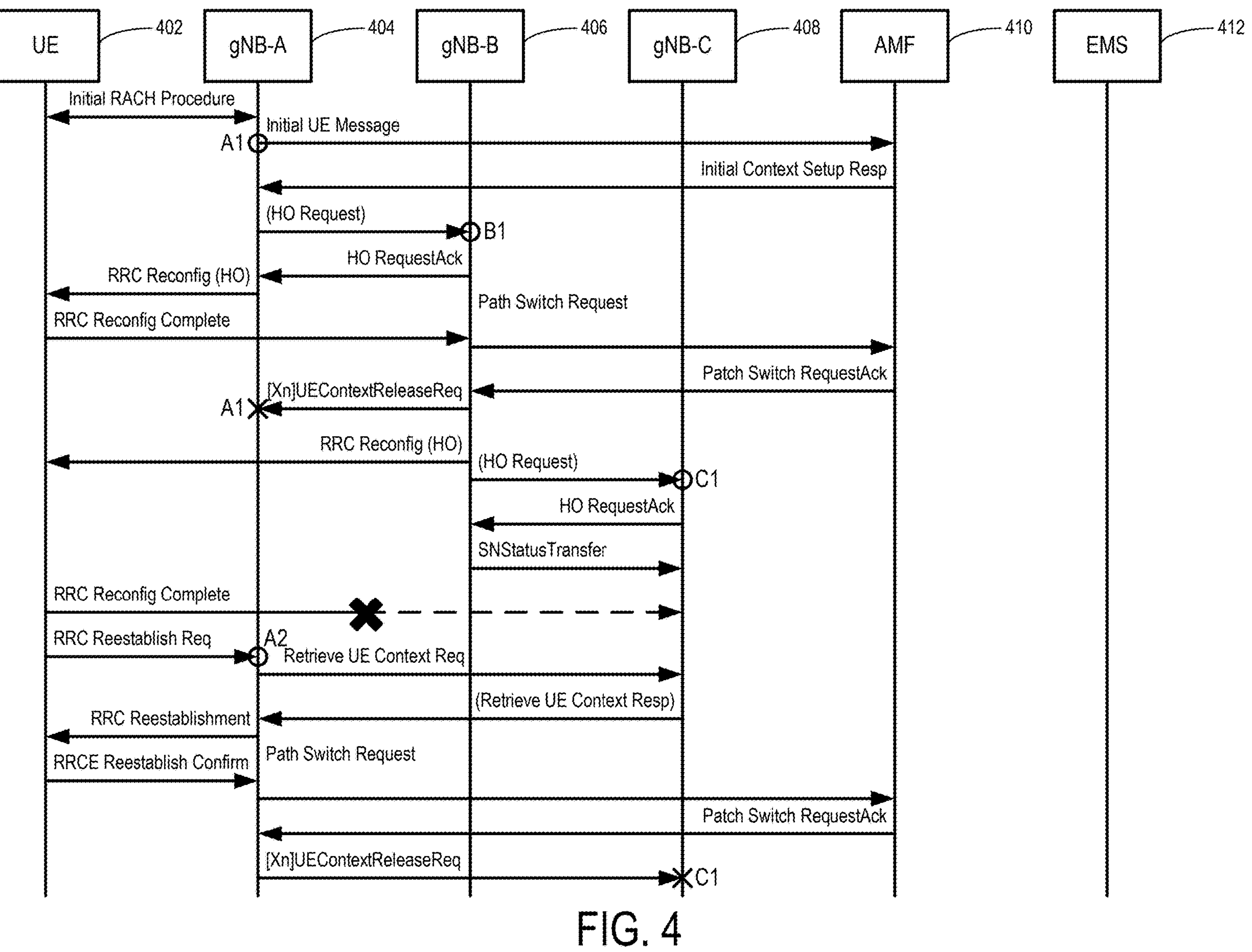
FIG. 4 illustrates an example of a communication flow, in accordance with various aspects of the present disclosure.
Figure 4:
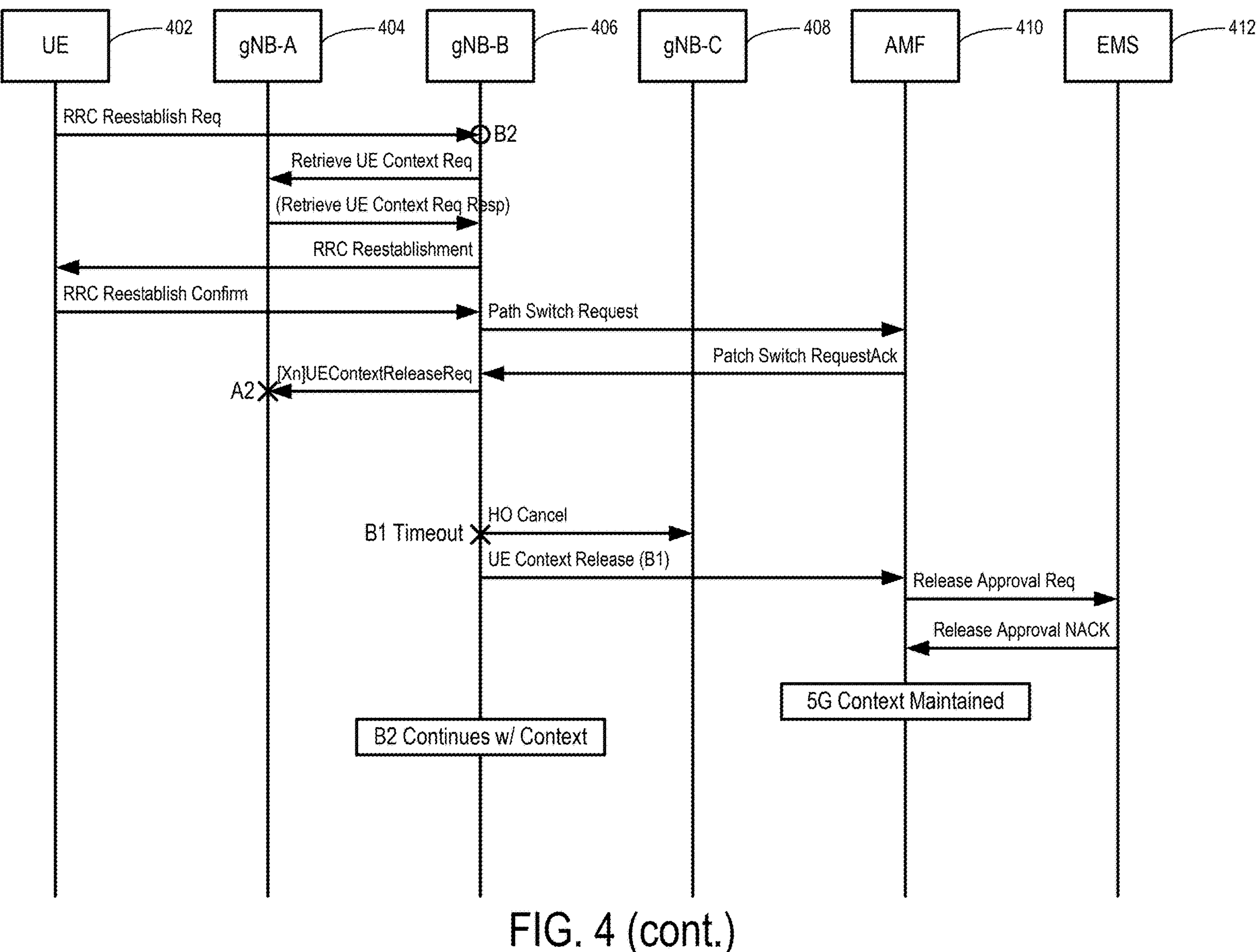

To prevent and/or reduce the incidence of such errors, the present disclosure presents systems, methods, and computer-readable media to manage communication sessions and cause gNBs to coordinate before triggering a UE context release request toward the AMF. FIG. 4 illustrates an example message flow among a UE 402, three gNBs 404, 406, and 408, an AMF 410, and an EMS 412, in which call-drop and/or muting issues caused by RAN-id conflicts may be mitigated and/or avoided.

The initial message flow shown in FIG. 4 is similar to that shown in FIG. 3. That is, when the UE 402 initially joins the network via gNB-A 404, the gNB-A 404 sends an initial message to the AMF 410. In response, the AMF 410 establishes a first RAN-id and an AMF-id for the UE 402. At this point, a communication session A1 is established between the UE 402 and the gNB-A 404. At a later time, the UE 402 seeks handover from the gNB-A 404 to the gNB-B 406. The gNB-A 404 sends a handover request message to the gNB-B 406, in response to which the gNB-B 306 establishes a communication session B1 between the UE 402 and the gNB-B 406 and requests that the UE 404 reconfigure its RRC accordingly. The communication session B1 is established with a second RAN-id but the same AMF-id. Upon reconfiguration completion, the gNB-B 406 requests a path switch from the AMF 410, which is acknowledged by the AMF 410. In response, the gNB-B 406 issues a UE context release request to the gNB-A 404, the gNB-A 404 terminates the communication session A1 and flushes the first RAN-id, and the AMF 410 updates itself to reflect the second RAN-id. Thus, the handover operations occurs successfully.

However, as the network session continues, an error (such as an RF error) may lead to the same situation in the comparative example of FIG. 3; that is, there later may be two communication sessions between the UE 402 and the gNB-B 406 having the same AMF-id but different RAN-ids. In this example, when the AMF 410 receives a UE context release request (e.g., from the gNB-B 406), it transmits a release approval request to the EMS 412. The EMS 412 determines whether there is a conflict before responding to the AMF 410 with an acknowledgement (indicating that it is safe for the AMF 410 to release the context corresponding to the AMF-id) or a non-acknowledgement (indicating that the AMF 410 should not release context corresponding to the AMF-id). Upon receiving a non-acknowledgement, the AMF 410 maintains the 5G context corresponding to the AMF-id and thus communication session B2 may continue with context. In some examples, the AMF 410 may then instruct the UE to perform a RRC reestablishment procedure to remedy the issue. This may avoid errors in the communication session B2.

While FIG. 4 illustrates one example in which the AMF 410 consults the EMS 412 upon receiving a UE context release request, other example implementations are within the scope of the present disclosure. For example, rather than operation via the EMS 412, the methods of the present disclosure may utilize another NF. In another example, the AMF 410 may organize multiple gNBs (e.g., the gNB-A 404, the gNB-B 406, and the gNB-c 408) into a group. The group may be based on a Neighbor Table and/or a recent Handover Association mess matrix to handle the UE experience and eliminate dropped calls observed in the network with the multi-target RRC reestablishment feature. The gNB groups may be dynamic, such that it's possible to move a particular DU from one CU to another as needed. Moreover, it may be possible to block handovers from certain CUs, for example if it is anticipated that such handover operations are likely to cause errors.

Figure 5:
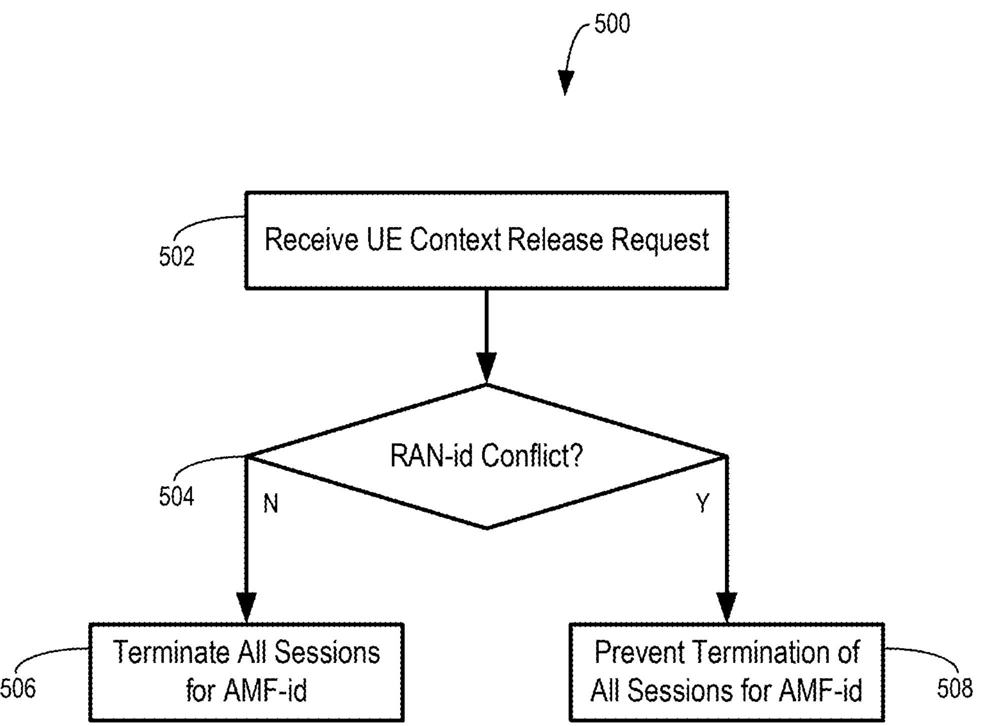
FIG. 5 illustrates an example of a gNB coordination method in accordance with various aspects of the present disclosure.

FIG. 5 illustrates an example method 500 for gNB coordination and session management. The method 500 may be performed by a device in a telecommunications network that is located upstream of and/or operates to control one or more RUs. In one example, the method 500 may be performed in a network node forming part of the NFs at the regional, national, or other geographic level. For purposes of explanation, the method 500 will be referred to as being performed by an EMS.

The method 500 begins with an operation 502 of receiving a UE context release request and/or a path switch request. The request may be received by a network node associated with an AMF. The request may indicate a handover request, in which a UE requests handover from a first (source) gNB to a second (target) gNB. At this point, the UE may be associated with a RAN-id corresponding to the particular communication session between the UE and the source gNB, and an AMF-id corresponding to the overall communication session between the UE and the AMF (e.g., between the UE and all gNBs operating under control of the AMF).

Upon receiving the request, at operation 504 it may be determined whether a RAN-id conflict exists. A RAN-id conflict may exist whenever an AMF-id is associated with multiple RAN-ids. The determination may be performed by the EMS or another NF, and/or may be based on a gNB group formed as described above. If, at operation 504, it is determined that there is no RAN-id conflict, at operation 506 all sessions for the AMF-id may be terminated. In one example, the EMS may cause the target gNB to issue a UE context release request to the AMF network node, thereby to cause the AMF network node to terminate all communications sessions associated with the AMF-id. This may include transmitting a context release approval message. If, however, it is determined that there is a RAN-id conflict, at operation 508 sessions for the AMF-id may be prevented from being terminated. Instead, the EMS and/or the AMF may instruct the UE to perform a RRC reestablishment procedure and/or may clear the conflicting RAN-id while maintaining the AMF-id.

Figure 6:
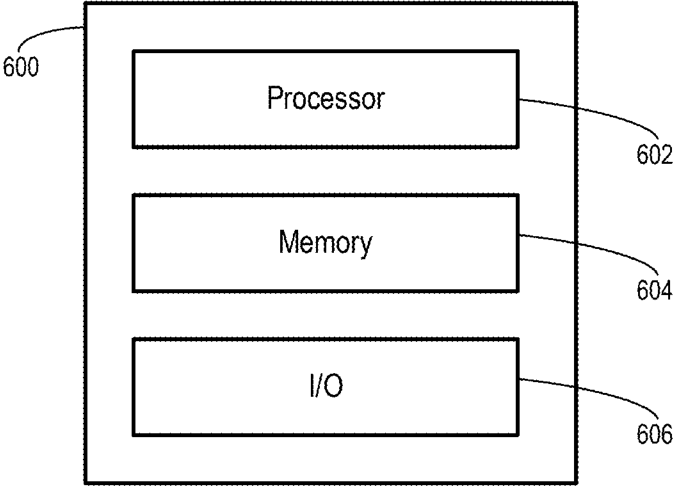
FIG. 6 illustrates an example of a gNB coordination system in accordance with various aspects of the present disclosure.

The method 500 may be implemented by a device operating in a telecommunications network. For example, in a telecommunications network including a gNB (e.g., wireless access point 104 of FIG. 1) configured to communicate with a UE (e.g., UE 102 of FIG. 1), the method 500 may be implemented on a virtual RAN server (e.g., virtualized RAN components 106 of FIG. 1) that is operatively connected to the gNB. FIG. 6 illustrates one example of a virtual RAN server 600. The virtual RAN server 600 is an example of the smart gNB coordinator discussed above, and may be implemented as a network node. The network node may be located at a site level (e.g., a network level, a geographic level, etc.) of the telecommunications network, and may control scheduling operations for one or more wireless access points (e.g., one or more DUs, one or more RUs, etc.) in the network.

As illustrated, the virtual RAN server 600 comprises a processor 602, a memory 604, and an input/output (I/O) interface 606. The virtual RAN server 600 may be configured with various modules (e.g., various software modules) to implement network management functions, such as session management and coordination functions. In one example, the modules may be present in the memory 604 in the form of instructions that, when executed by the processor 602, cause the virtual RAN server 600 to perform any one or more of the operations described herein. In another example, the processor 602 may be configured to load and/or execute instructions from another non-transitory computer-readable medium (e.g., cloud storage or from the memory of another device). In some examples, the following modules may be in the form of xApps and/or rApps (or portions or combinations thereof).

The virtual RAN server 600 may comprise a data receipt module configured to receive, for example, a UE context release request and/or a path switch request. The request may indicate a handover request, in which a UE requests handover from a first (source) gNB to a second (target) gNB. At this point, the UE may be associated with a RAN-id corresponding to the particular communication session between the UE and the source gNB, and an AMF-id corresponding to the overall communication session between the UE and the AMF (e.g., between the UE and all gNBs operating under control of the AMF).

The virtual RAN server 600 may comprise a logic module to perform certain determinations and other logical operations. For example, the logic module may be configured to determine whether a RAN-id conflict exists. A RAN-id conflict may exist whenever an AMF-id is associated with multiple RAN-ids. The determination may be performed by the EMS or another NF, and/or may be based on a gNB group formed as described above. If, it is determined that there is no RAN-id conflict, all sessions for the AMF-id may be terminated. In one example, the EMS may cause the target gNB to issue a UE context release request to the AMF network node, thereby to cause the AMF network node to terminate all communications sessions associated with the AMF-id. This may include transmitting a context release approval message. If, however, it is determined that there is a RAN-id conflict, sessions for the AMF-id may be prevented from being terminated. Instead, the EMS and/or the AMF may instruct the UE to perform a RRC reestablishment procedure and/or may clear the conflicting RAN-id while maintaining the AMF-id.

The I/O 606 may include interface components to permit the communication of data to and from external devices or sources. For example, the I/O 606 may include communication ports and/or interfaces to permit communication with other computer devices. The communication ports and/or interfaces may permit input and output via wired protocols (e.g., Ethernet, Universal Serial Bus (USB), FireWire, etc.) and/or wireless protocols (e.g., Wi-Fi, Bluetooth, Near Field Communication (NFC), 5G, 4G, etc.). The I/O 606 may additionally or alternatively include communication ports and/or interfaces to permit communication with a user. For example, the I/O 606 may include interfaces for a mouse, a keyboard, a display, a graphical user interface (GUI), buttons, switches, etc. Thus, the I/O 606 may permit a user to initiate the operations described herein and subsequently cause them to be performed on an automated basis and/or may be configured to receive instructions for the automated execution of the operations described herein.

Other examples and uses of the disclosed technology will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

What is claimed is:

1. A method of managing communication sessions in a telecommunications network, the method comprising:

receiving, at a first network node associated with an Access and Mobility Management Function (AMF), a path switch request, the path switch request indicating a handover request for a user equipment (UE) from a first gNB to a second gNB, wherein the UE is associated with a radio access network (RAN) identifier corresponding to a communication session between the UE and the first gNB and an AMF identifier corresponding to a communication session between the UE and the AMF;

determining whether the AMF identifier is associated with another RAN identifier; and in response to a determination that the AMF identifier is not associated with another RAN identifier, causing the second gNB to issue a UE context release request to the first network node, the UE context release request configured to cause the first network node to terminate all communication sessions associated with the AMF identifier.

2. The method according to claim 1, further comprising:

in response to a determination that the AMF identifier is associated with another RAN identifier, preventing the second gNB from issuing the UE context release request.

3. The method according to claim 1, wherein the operation of determining is performed by a second network node associated with an Element Management System (EMS) of the telecommunications network.

4. The method according to claim 1, wherein the operation of determining whether the AMF identifier is associated with another RAN identifier includes forming a gNB group, and determining whether the AMF identifier is associated with a plurality of gNBs of the gNB group.

5. The method according to claim 4, wherein the gNB group is formed based on a Neighbor Table or a recent Handover Association mess matrix.

6. The method according to claim 1, wherein the operation of causing the second gNB to issue the UE context release request includes transmitting, to the first network node, a context release approval message.

7. A telecommunications network comprising:

at least one processor in communication with a first network node; and a memory storing instructions that, when executed by the at least one processor, cause the first network node to:

receive a context release approval request from a second network node associated with an Access and Mobility Management Function (AMF), wherein the context release approval request is in response to a path switch request received by the second network node, the path switch request indicating a handover request for a user equipment (UE) from a first gNB to a second gNB, wherein the UE is associated with a radio access network (RAN) identifier corresponding to a communication session between the UE and the first gNB and an AMF identifier corresponding to a communication session between the UE and the AMF, determine whether the AMF identifier is associated with another RAN identifier, and in response to a determination that the AMF identifier is not associated with another RAN identifier, cause the second gNB to issue a UE context release request to the second network node, the UE context release request configured to cause the second network node to terminate all communication sessions associated with the AMF identifier.

8. The telecommunications network of claim 7, wherein the instructions are configured to further cause the first network node to, in response to a determination that the AMF identifier is associated with another RAN identifier, prevent the second gNB from issuing the UE context release request.

9. The telecommunications network of claim 7, wherein the first network node is associated with an Element Management System (EMS) of the telecommunications network.

10. The telecommunications network of claim 7, wherein the operation of determining whether the AMF identifier is associated with another RAN identifier includes forming a gNB group, and determining whether the AMF identifier is associated with a plurality of gNBs of the gNB group.

11. The telecommunications network of claim 10, wherein the gNB group is formed based on a Neighbor Table or a recent Handover Association mess matrix.

12. The telecommunications network of claim 7, wherein the operation of causing the second gNB to issue the UE context release request includes transmitting, to the second network node, a context release approval message.

13. The telecommunications network of claim 7, wherein the AMF identifier is configured to uniquely identify the UE across all RAN identifiers.

14. A non-transitory computer-readable medium storing instructions that, when executed by at least one processor of a computer in a telecommunications network, cause the computer to perform operations comprising:

receiving, at a first network node associated with an Access and Mobility Management Function (AMF), a path switch request, the path switch request indicating a handover request for a user equipment (UE) from a first gNB to a second gNB, wherein the UE is associated with a radio access network (RAN) identifier corresponding to a communication session between the UE and the first gNB and an AMF identifier corresponding to a communication session between the UE and the AMF;

determining whether the AMF identifier is associated with another RAN identifier; and in response to a determination that the AMF identifier is not associated with another RAN identifier, causing the second gNB to issue a UE context release request to the first network node, the UE context release request configured to cause the first network node to terminate all communication sessions associated with the AMF identifier.

15. The non-transitory computer-readable medium according to claim 14, the operations further comprising:

in response to a determination that the AMF identifier is associated with another RAN identifier, preventing the second gNB from issuing the UE context release request.

16. The non-transitory computer-readable medium according to claim 14, wherein the operation of determining is performed by a second network node associated with an Element Management System (EMS) of the telecommunications network.

17. The non-transitory computer-readable medium according to claim 14, wherein the operation of determining whether the AMF identifier is associated with another RAN identifier includes forming a gNB group, and determining whether the AMF identifier is associated with a plurality of gNBs of the gNB group.

18. The non-transitory computer-readable medium according to claim 17, wherein the gNB group is formed based on a Neighbor Table or a recent Handover Association mess matrix.

19. The non-transitory computer-readable medium according to claim 14, wherein the operation of causing the second gNB to issue the UE context release request includes transmitting, to the first network node, a context release approval message.

20. The non-transitory computer-readable medium according to claim 14, wherein the AMF identifier is configured to uniquely identify the UE across all RAN identifiers.

* * * * *